(12) United States Patent
Grabarnik et al.

(10) Patent No.: US 8,484,141 B2
(45) Date of Patent: Jul. 9, 2013

(54) EVALUATING ONTOLOGIES

(75) Inventors: Genady Grabarnik, Scarsdale, NY (US); Zhen Liu, Tarrytown, NY (US); Anand Ranganathan, Stamford, CT (US); Anton V. Riabov, Ossining, NY (US); Irina Rish, Rye Brook, NY (US); Larisa Shwartz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 691 days.

(21) Appl. No.: 12/658,135

(22) Filed: Feb. 2, 2010

(65) Prior Publication Data

US 2011/0191273 A1 Aug. 4, 2011

(51) Int. Cl.
*G06F 17/20* (2006.01)
*G06F 15/18* (2006.01)

(52) U.S. Cl.
USPC .............................. 706/12; 707/794; 709/205

(58) Field of Classification Search
USPC .......................................................... 706/12
See application file for complete search history.

(56) References Cited

U.S. PATENT DOCUMENTS

2010/0057815 A1* 3/2010 Spivack et al. ................ 707/794
2011/0238610 A1* 9/2011 Lee et al. ......................... 706/50

OTHER PUBLICATIONS

"Extending the SHOIQ(D) Tableaux with DL-Safe Rules: First Results", Vladimir Kolovski, et al, University of Maryland, (2005), pp. 1-8.
"Query Answering for OWL-DL with Rules", Boris Motik, et al, University of Karlsruhe, (2004), pp. 549-563.
"Combination and Integration of Ontologies on the Semantic Web" (Dissertation Draft), Bernardo Cuenca Grau (2005) pp. 1-238.

* cited by examiner

*Primary Examiner* — Kakali Chaki
*Assistant Examiner* — Kalpana Bharadwaj
(74) *Attorney, Agent, or Firm* — Harrington & Smith

(57) ABSTRACT

A method for providing an evaluation/verification of the correctness of an ontology is described. The method includes loading a first ontology associated with a first rule set. an extended ontology and an extended rule set are generated based at least in part on the first ontology and the first rule set. The extended rule set is applied to the extended ontology. The method also includes determining (e.g., by a data processor) a correctness of the extended ontology. Results are generated which include the correctness. Apparatus and computer readable media are also described.

20 Claims, 4 Drawing Sheets

General Workflow

EVALUATING ONTOLOGIES

TECHNICAL FIELD

The exemplary and non-limiting embodiments of this invention relate generally to classification of ontologies and, more specifically, relate to evaluation/verification of a goodness of an ontology.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Today, rules impact a huge number of target business applications ranging from insurance adjudication, loan approval, claims processing, credit scoring, product/service recommendations, order configuration and fraud detection. A typical application may implement between 100 and 1,000 rules. Complex rules are not only difficult to code into applications, they also difficult to maintain using traditional coding practices.

Semantic processing helps bridge the gap between human and computer syntax. Reducing the Human-Computer gap can ease conceptualization and enhance human activity with concept processing. Semantic processing may make use of ontologies which define objects (data), properties of those objections (e.g., relationships with other objects) and logic. This information may then be used to process the objects, for example, query, navigate, serialize, and reason.

There is interest in the extension of rules applications into Semantic Web Languages. The Semantic Web is based on the idea of incorporating a format descriptive form (e.g., XML with logical processing) and additional structures (e.g., inheritance, data types, axioms, etc.). This provides a duality between expressivity and some computational properties related to an ability to reason over data.

A complexity-read restriction for the expressivity of ontology web language (OWL) languages depends on a number of factors, for example:
1. Use of an open world assumption—meaning that information about facts which is not directly asserted is unknown (e.g., lack of a definition does not imply that the statement is false and/or there is no assumption that the known facts comprise all known facts); and
2. The possibility to have different people with the same name at the same time, people with the same aliases be same the person, etc.

These factors make use of many ontology models questionable. One approach is to make ontological data more compact and to apply rules that make description by the ontology more compact and manageable.

Semantic Web Rule Language (SWRL) is a combination of the OWL DL and OWL Lite sublanguages with the Unary/Binary Datalog. It is an extension to OWL with Horn-style rules. SWRL provides expressivity and compatibility. Furthermore, it follows OWL's XML and RDF syntax. SWRL limits predicates to being OWL classes and properties.

What is needed is a way to evaluate/verify ontologies in order to determine their correctness/goodness.

SUMMARY

The below summary section is intended to be merely exemplary and non-limiting.

The foregoing and other problems are overcome, and other advantages are realized, by the use of the exemplary embodiments of this invention.

An exemplary embodiment in accordance with this invention is a method for providing an evaluation/verification of the correctness of an ontology. The method includes loading a first ontology associated with a first rule set. An extended ontology and an extended rule set are generated based at least in part on the first ontology and the first rule set. The extended rule set is applied to the extended ontology. The method also includes determining (e.g., by a data processor) an correctness of the extended ontology. Results are generated which include the correctness.

An additional exemplary embodiment in accordance with this invention is an apparatus for providing an evaluation/verification of the correctness of an ontology. The apparatus includes a microprocessor coupled to a memory, wherein the microprocessor is configured to load a first ontology associated with a first rule set; to generate an extended ontology and an extended rule set based at least in part on the first ontology and the first rule set; to apply the extended rule set to the extended ontology; to determine an correctness of the extended ontology; and to generating results including the correctness.

A further exemplary embodiment in accordance with this invention is a computer readable medium for providing an evaluation/verification of the correctness of an ontology. The computer readable medium tangibly encoded with a computer program executable by a processor to perform actions. The actions include loading a first ontology associated with a first rule set; generating an extended ontology and an extended rule set based at least in part on the first ontology and the first rule set; applying the extended rule set to the extended ontology; determining an correctness of the extended ontology; and generating results including the correctness.

An additional exemplary embodiment in accordance with this invention is an apparatus for providing an evaluation/verification of the correctness of an ontology. The apparatus includes means for loading a first ontology associated with a first rule set; means for generating an extended ontology and an extended rule set based at least in part on the first ontology and the first rule set; means for applying the extended rule set to the extended ontology; means for determining an correctness of the extended ontology; and means for generating results including the correctness.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

As used herein, an ontology is defined as a formal representation of a set of classes (or concepts) within a domain, and a set of relationships between the classes. Furthermore, an ontology includes a collection of assertions about various objects (e.g., instances of the classes) and their relationships with other objects and classes, which are defined in accordance with the ontology model. An ontology may be associated with a inference model that is used to make additional inferences about classes and instances.

As used herein, a rule is a logical inference which may be made based on one or more classes, instances and relationships defined in the ontology. The logical inference model used in the rule may be the same as or maybe different from the logical inference model used in the ontology.

As used herein, an ontology model is defined as a set of object types and a set of properties and relationships for the object types. Furthermore, an ontology is defined as a collection various objects (e.g., instances of the object type) which are defined in accordance with the ontology model. As used herein, an ontology rule is a logical inference which may be made based on one or more objects, properties and/or relationships.

As used herein, an extended ontology is ontology which has been expanded with additional assertions on the objects and classes, as a result of applying rules or other inference models on the ontology.

As used herein, the goodness of an ontology is a measure of the suitability of an ontology for a given purpose, for example, by meeting criteria, to function properly, etc.

As used herein, the correctness of an ontology is an objective measure of the errors of the ontology.

Figure 3:
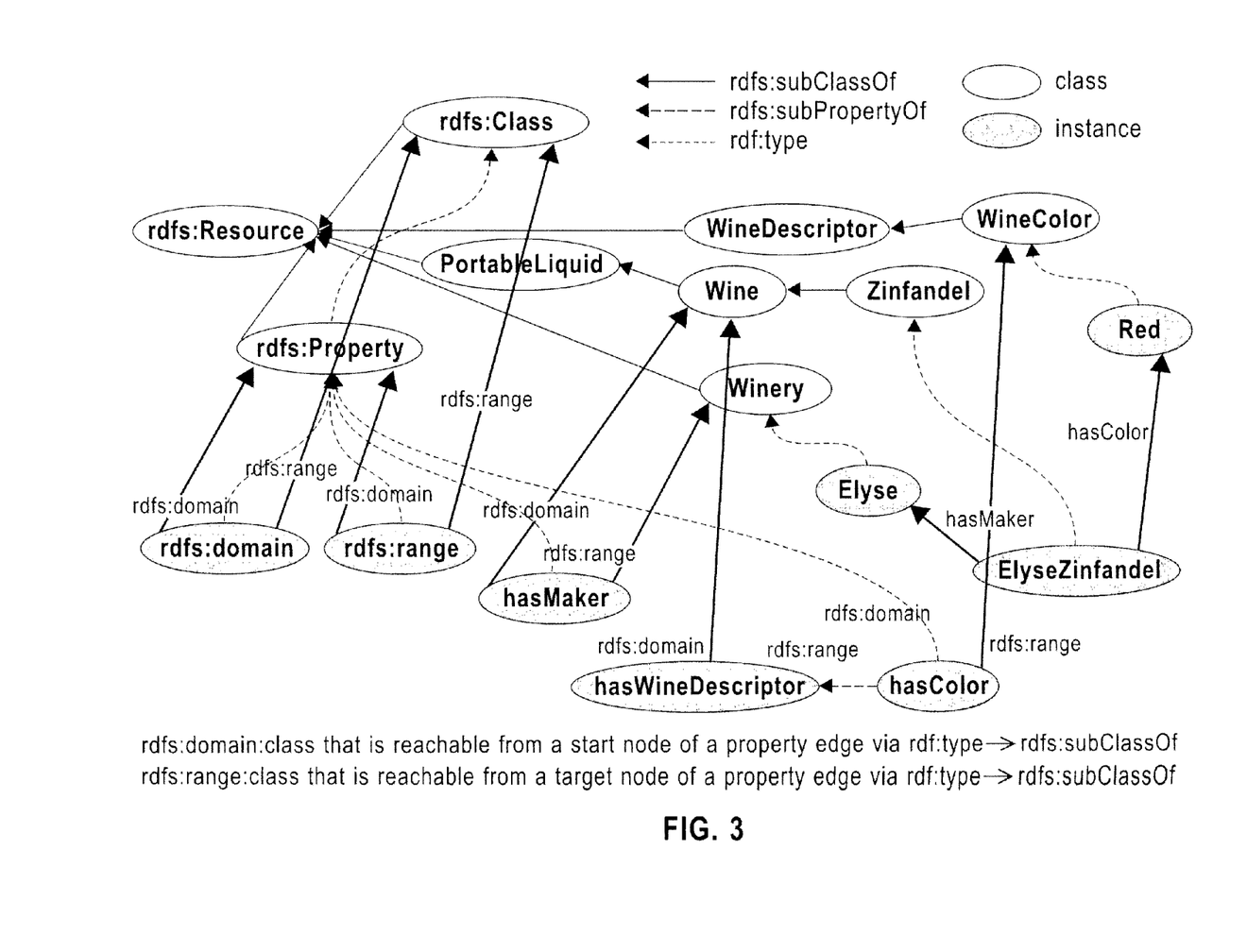
FIG. 3 illustrates a simplified diagram of an ontology.

FIG. 3 illustrates a simplified diagram of an ontology. As shown, the instance "Elyse Zinfandel" has a relationship of "hasColor" with "Red" (thus, providing the inference that "Elyse Zinfandel" is red. Likewise, "Elyse Zinfandel" has a relationship of "hasMaker" with "Elyse".

The diagram indicates that "Elyse Zinfandel" is of a type "Zinfandel, which is a "class of" "wine" which, in turn, is a "class of" "Potable Liquid". This may be viewed as a set of statements, for example, "all wines are potable liquids, all Zinfandel are wines, etc.

Various exemplary embodiments in accordance with this invention provide an evaluation/verification of the correctness/goodness of an ontology. The ontology is enhanced using modification rules and the resulting ontology is classified.

With the wider use of ontologies in as part of production systems, need for ontology maintenance and evaluation is emerging. In many cases ontology authoring is done in layered/hierarchical way. This make a problem of keeping good/valid combined ontology crucial. Another possible model of authoring ontology is when editors use a client-server approach. The ontology resides on a central server that all editors access remotely. Changes made by one user are immediately visible to everyone. In this case there is no separate verification/evaluation of various archived versions. Various exemplary embodiments in accordance with this invention enable ontology quality control on the model and syntactic level.

An ontology may be extended by adding complimentary subjects and properties to describe debug terms, warnings, error terms and other properties in such a way that there is no terminology ambiguity for the ontology. In addition, enhancement extension descriptors (for subjects and properties), results content descriptors and results presentation descriptors may be generated automatically/semi-automatically and used to extend the ontology.

Most stream contents should be variables. Warnings should be provided if they are not. This pertains to both direct and indirect content as well as to both ObjectType and DataType properties values. Likewise, most NewObjectCreated should be VariableInstance.

Similarly, objects which on an output stream and that are not also on an input stream, may be identified a NewObjectCreated. Errors should be flagged if objects directly or indirectly on an output stream and not on an input stream are not marked as NewObjectCreated. Additionally, objects on an input stream should not be marked as NewObjectCreated.

Care must be taken to ensure cardinality constraints are met and that property values are be in defined range(s). Errors should be flagged if these conditions are not met.

Rules may be applied to help make the ontology more compact and manageable by using specialized rule engines system with a specific language (RL). These rule engines may translation the initial data and provide results of the processing by rule application to (and from) the RL. Using Jess as the rule engine, the ontology would be translated into the "facts" and "rules" that Jess is able to operate upon. Then system rules are applied. Next, the resulting "facts" and "rules" (modified by the system rules) are translated back into an ontology.

The SWRL rule language may not require translation since it operates directly on the ontology terms.

Many ontologies have self describing capabilities. These self describing capabilities may be used to describe both safe ontology rules and data. This information may then be used to identify reasoners supporting these safe ontology rules. The reasoners may then be used to generate validation/goodness information.

First an extension describing validation/goodness and missing ontology rules as well as safe ontology rules is generated. During this procedure the extensions are restricted so that they do not intersect the main ontologies and so that no new constants are generated by the rules.

Ontologies may be embedded into e-connection ontologies. This ensures that a resulting summarizing ontology meets the requirements for an OWL DL ontology. For additional details on e-connection see: "Combination and Integration of Ontologies on the Semantic Web", DISSERTATION, Bernardo Cuenca Grau, Jun. 25, 2005.

An existing OWL DL reasoner may be used to classify the ontology. Statements regarding warnings and errors may be extracted from the resulting classified ontology and presented to a user.

Figure 1:
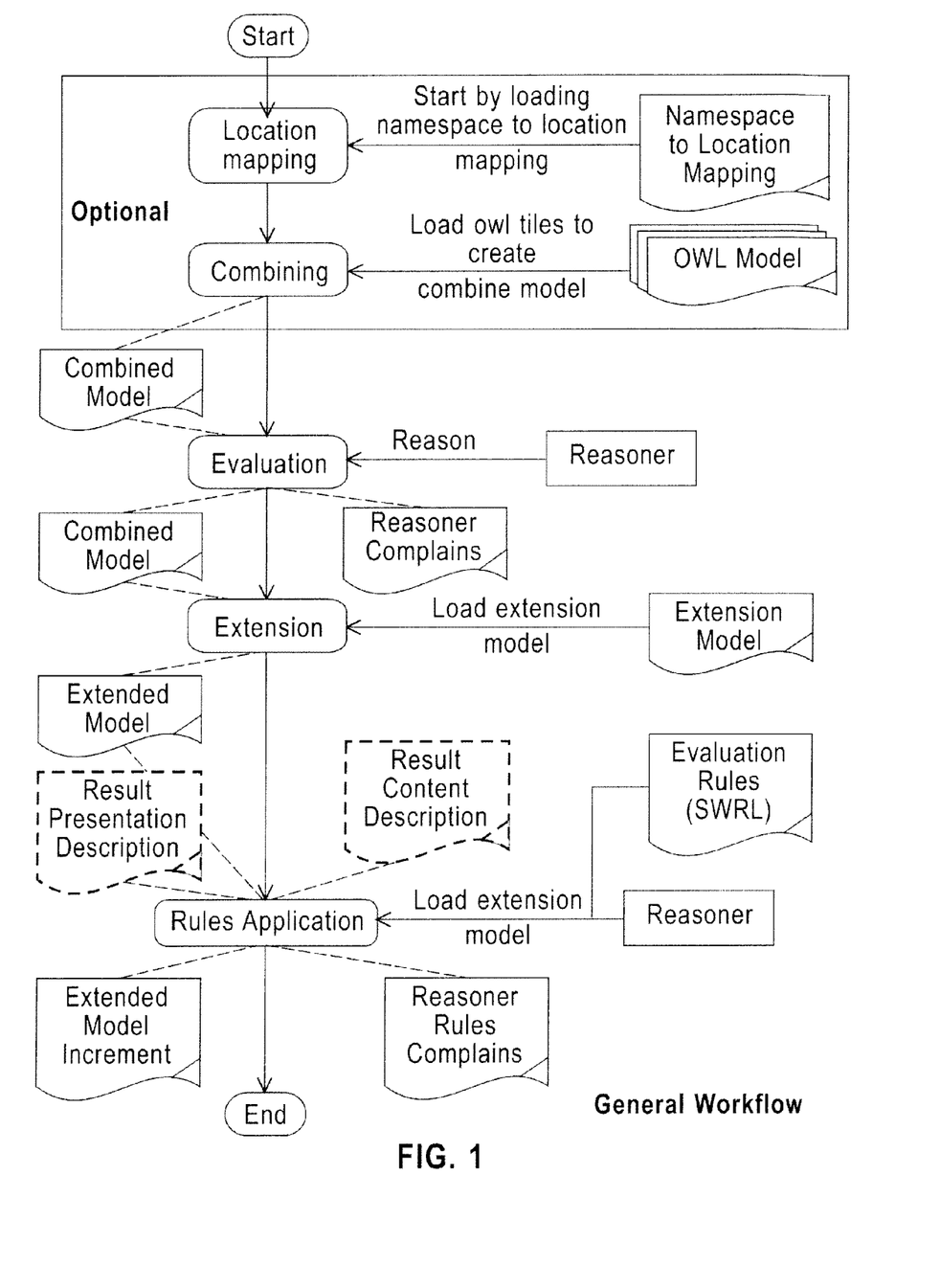
FIG. 1 is a logic flow diagram that illustrates the main workflow of an exemplary embodiment in accordance with this invention.

FIG. 1 shows a logic flow diagram that illustrates the main workflow of an exemplary embodiment in accordance with this invention. A method operating as shown may begin with the optional steps of location mapping and combining. Location mapping may include resolution of the namespace location and/or loading a namespace, which may be stored locally, on a connected server/database, or on a network (e.g., the Internet). An exemplary code segment to aid in resolution of the namespace location is as follows:

DocumentManager dm=model.getDocumentManager( );
DocumentManager.
addLocationEntries(dm, urlFileName);
dm.clearCache( );
dm.loadImports(model);
model.refresh( );

A Sample Mapping OWL Model is as follows:

```
<owl:Class rdf:ID="LocationMapping"/>
<owl:DatatypeProperty rdf:ID="altURL">
    <rdfs:domain rdf:resource="#LocationMapping"/>
    <rdfs:range rdf:resource="&xsd;string"/>
</owl:DatatypeProperty>
<owl:DatatypeProperty rdf:ID="language">
    <rdfs:domain rdf:resource="#LocationMapping"/>
    <rdfs:range rdf:resource="&xsd;string"/>
</owl:DatatypeProperty>
<owl:DatatypeProperty rdf:ID="prefix">
    <rdfs:domain rdf:resource="#LocationMapping"/>
    <rdfs:range rdf:resource="&xsd;string"/>
</owl:DatatypeProperty>
<owl:DatatypeProperty rdf:ID="publicURL">
    <rdfs:domain rdf:resource="#LocationMapping"/>
    <rdfs:range rdf:resource="&xsd;string"/>
</owl:DatatypeProperty>
```

One or more existing ontologies (e.g., OWL models) may be combined by loading the files to create a combined ontology (e.g., the combined model). An exemplary code segment to aid in combining ontologies and in classifying ontologies is as follows:

```
model.loadOWLModel(urlCombineModel);
model.combineSubModels( );
Iterator ei = model.listOntologies( );
while(ei.hasNext( )){
    DIOWLOntology ont = (DIOWLOntology ) ei.next( );
    onts.add(ont);}
for(DIOWLOntology ont:onts){
    ont.removeProperties( );}
```

The above code further includes a step for removing repeating ontologies (e.g., the final for-loop).

An exemplary code segment to aid in classifying ontologies is as follows:

```
OWLModel model = createClassifiedModel( );
model.loadOWLModel(combinedModel);
```

The method continues with an evaluation of the ontology. A reasoner may be used to provide evaluation rules. These rules may include pre-existing rules and/or specifically authored rules. The reasoner may generate notices of any potential problems and/or complains.

Extension of the ontology may also be performed. An extension model may be loaded into the ontology. The extension may include additional rules in order to ensure the resulting extended model is a) an open-world model or b) a closed-world model. Other rules may be used to handle/identify any potential name/label conflicts. An exemplary code segment to aid in extending an ontology is as follows:

```
model.loadOWLModel(urlCombinedModel);
List listProperties= model.ListProperties( );
List listObjectProperties= model.ListObjectProperties( );
List listDatatypeProperties= model.ListDatatypeProperties( );
OWLObjectProperty containsObject =
model.createObjectProperty("http://tooling#containsObjectProperty");
OWLDatatypeProperty containsDatatype =
model.createDatatypeProperty("http://tooling#containsDatatypeProperty");
OWLDatatypeProperty warn =
model.createDatatypeProperty("http://tooling#warn");
OWLResource thing =
model.getOWLResource("http://www.w3.org/2002/07/owl#Thing");
OWLResource resString =
model.getOWLResource("http://www.w3.org/2001/XMLSchema#string");
containsObject.addDomain(thing);
containsObject.addRange(thing);
containsObject.convertToTransitiveProperty( );
containsDatatype.addDomain(thing);
containsDatatype.addRange(resString);
warn.addDomain(thing);
warn.addRange(resString);
for(DIOWLProperty prop:properties) {
    if(!( prop.getURI( ).contains("containsObjectProperty")||
    prop.getURI( ).contains("containsDatatypeProperty"))){
        if (prop.isObjectProperty( )){
            prop.addSuperProperty(containsObject);}
        else if (prop.isDatatypeProperty( )){
            for (Iterator iter = prop.listRange( ); iter.hasNext( );){
                DIRDFResource element = (DIRDFResource) iter.next( );
                if (element.getURI( ).contains("string")){
                    prop.addSuperProperty(containsDatatype);
                    break;}}}}}
presentWarnAndPrint(model);
```

An exemplary code segment to aid in applying rules to an ontology is as follows:

```
Model model = createOWLModel( );
model.loadOWLModel(urlCombinedModelContainedClosed);
Model model1 = createRuledModel(model, rulesFileURL);
queryContentPresentWarnAndPrint(model1);
```

The extended model may proceed to a rules application stage. This stage may also make use of a "rules presentation description" and/or a "result content description". Additional extension model(s) may be loaded via a reasoner which may include SWRL evaluation rules. The resulting rules are then applied to the model. The resulting extended model increment is output (e.g., saved to memory). Additionally, an evaluation (e.g., goodness/correctness, an estimated run time) of the ontology may be provided. The original ontology (or ontologies) may be extended with rules that describe possible errors in the model and/or possible warnings in the model. Since the ontology may be extended as an e-connection, the ontology is the same type of ontology it was before, e.g., owl dl type, so the rule base systems may reason over it with known time estimates. This may be formatted in accordance with a "rules presentation description" and/or a "result content description". This may include reasoner rules issues identified.

As the extended ontology may include different types of errors, for example, fatal errors, avoidable errors, warning, etc., or be without any errors, the evaluation may weigh the types of errors differently. For example, an ontology with one avoidable error may be more correct than an ontology with a fatal error. Ontologies may then be compared based on their respective correctness.

Figure 2:
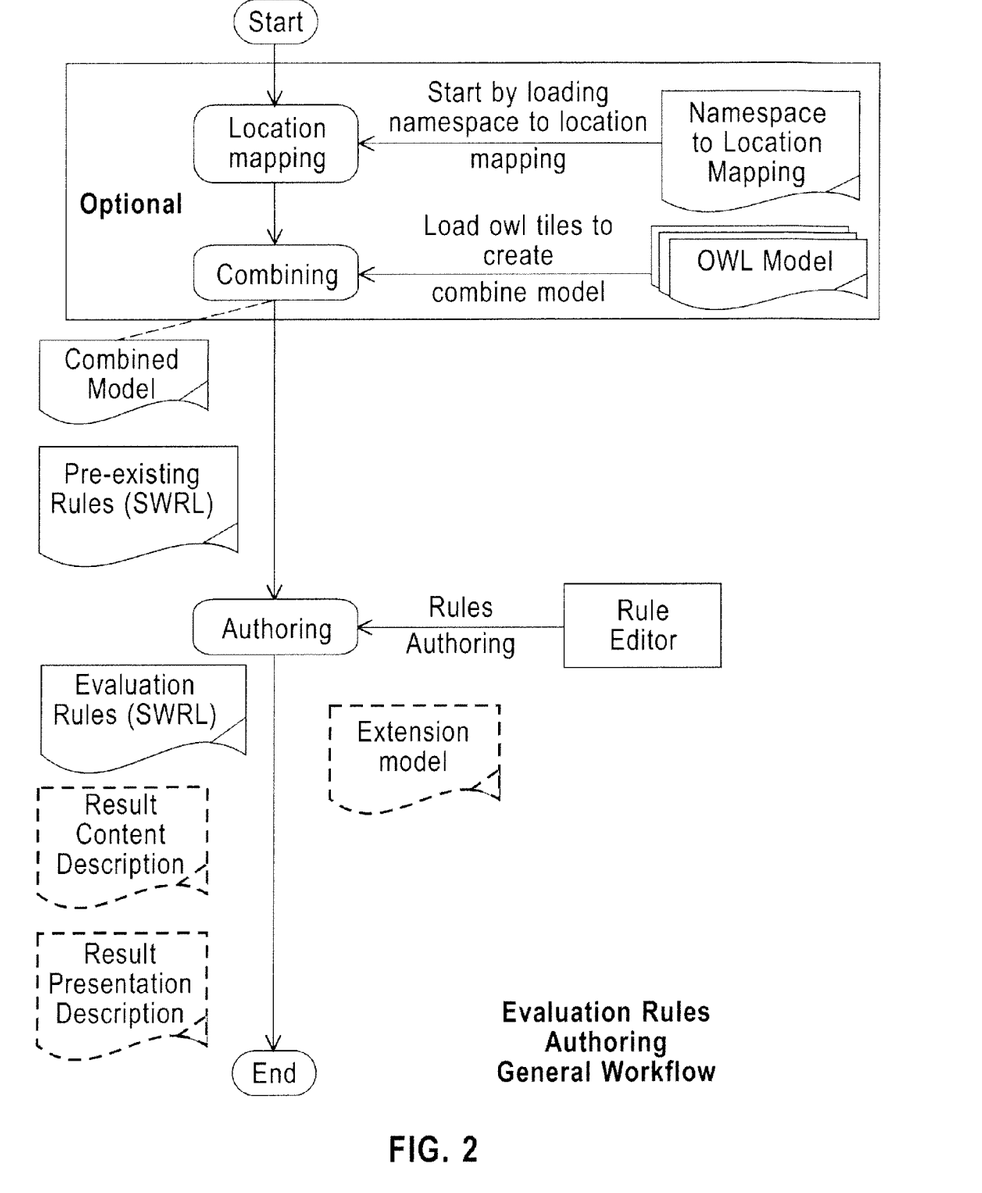
FIG. 2 is a logic flow diagram that illustrates the evaluation rules authoring.

FIG. 2 shows a logic flow diagram that illustrates the main workflow of evaluation rules authoring of an exemplary embodiment in accordance with this invention. As shown in FIG. 1, location mapping may be performed which includes loading a namespace, which may be stored locally, on a connected server/database, or on a network (e.g., the Internet). One or more existing ontologies (e.g., OWL models) may be combined by loading the files to create a combined ontology (e.g., the combined model).

A set of pre-existing rules (e.g., SWRL) may be provided. Additionally, a rule editor may be used to author rules. The rule editor may also be used to modify rules, for example, rules provided by the pre-existing rules and/or rules provided by the (combined) ontology model.

The resulting ontology (including the authored rules) may be extended. The resulting extension model may be used to generate evaluation rules. These rules may be generated by using a GUI, by coding and/or inferred from formal model descriptions. Additionally, a result content description (for example, in the form of SPARQL query) and a results presentation description may also be generated. An exemplary code segment to aid in generation of the extension model is as follows:

```
<rdf:Description rdf:about= http://tooling#warn><rdf:type rdf:resource=
"http://www.w3.org/2002/07/owl#DatatypeProperty"/>
  <rdfs:domain rdf:resource= "http://www.w3.org/2002/07/owl#Thing"/>
  <rdfs:range rdf:resource=
"http://www.w3.org/2001/XMLSchema#string"/>
</rdf:Description>
```

An exemplary code segment to aid in generation of the results content description (e.g., SPARQL) is as follows:

query="SELECT ?s ?o WHERE {?s http://tooling#warn ?o .}";

An exemplary code segment to provide a rule descriptor (e.g., SWRLX) is as follows:

```
<ruleml:_body>
<swrlx:classAtom>
<owlx:Class owlx:name= "http://core.owl#Stream"/>
<ruleml:var>str2</ruleml:var>
</swrlx:classAtom>
<swrlx:individualPropertyAtom swrlx:property=
"http://tooling#containsObjectProperty">
<ruleml:var>str2</ruleml:var>
<ruleml:var>obj2</ruleml:var>
</swrlx:individualPropertyAtom>
<swrlx:datavaluedPropertyAtom swrlx:property=
"http://tooling#containsDatatypeProperty">
<ruleml:var>obj2</ruleml:var>
<ruleml:var>lit1</ruleml:var>
</swrlx:datavaluedPropertyAtom>
<swrlx:builtinAtom swrlx:builtin= "doesNotContain">
<ruleml:var>lit1</ruleml:var>
<owlx:DataValue owlx:datatype=
"http://www.w3.org/2001/XMLSchema#string">?</owlx:DataValue>
</swrlx:builtinAtom>
<swrlx:builtinAtom swrlx:builtin= "doesNotContain">
<ruleml:var>lit1</ruleml:var>
<owlx:DataValue owlx:datatype=
"http://www.w3.org/2001/XMLSchema#string">@@</owlx:DataValue>
</swrlx:builtinAtom>
<swrlx:builtinAtom swrlx:builtin= "print">
<owlx:DataValue owlx:datatype=
"http://www.w3.org/2001/XMLSchema#string">
Checked lack of @@</owlx:DataValue>
<ruleml:var>lit1</ruleml:var>
</swrlx:builtinAtom>
</ruleml:_body>
<ruleml:_head>
<swrlx:datavaluedPropertyAtom swrlx:property=
"http://tooling#warn">
<ruleml:var>obj1</ruleml:var>
owlx:DataValue owlx:datatype=
"http://www.w3.org/2001/XMLSchema#string">
stream contained object not variable value</owlx:DataValue>
</swrlx:datavaluedPropertyAtom>
</ruleml:_head>
```

An exemplary code segment to aid in the generation of the extension model content description and presentation description is as follows:

```
//load underlying main ontology model
model.loadOWLModel(ontFileName, acl);
    //load rules
RuleNodeEnv rne = loadRulesFromFile(rulesFileName);
    //do all necessary preparatory work
rne.initOWLpart(model);
rne.findDiffs( );
    //create Extension Model as a difference
    //between main ontology and embedding of the rules into the
    ontology
rne.generateDiffOWLModel( );
    //use head of the rules part to extract possible variables/candidates for
    // query that generates Content Description to be exposed
rne.generateDiffSPARQLQuery( );
    //based on SPARQL query generate possible
presentation of the query result
rne.generatePresentationForQuery( );
    //output the result of generation process
System.out .println(rne.toString( ));
```

Various exemplary embodiments in accordance with this invention, describe a method for evaluation/verification of the correctness of an ontology. The method includes using enhancement of ontologies, ontology modification rules and classification of ontologies. The ontology may be OWL DL level. The rules may be expressed in a SWRL format. Ontology modifications may be restricted to those in OWL DL format. The extension descriptor, results content descriptor and/or results presentation descriptor may be generated automatically or semi-automatically.

Based on the foregoing it should be apparent that the exemplary embodiments of this invention provide a method, apparatus and computer program(s) to provide an evaluation/verification of the correctness of an ontology.

Figure 4:
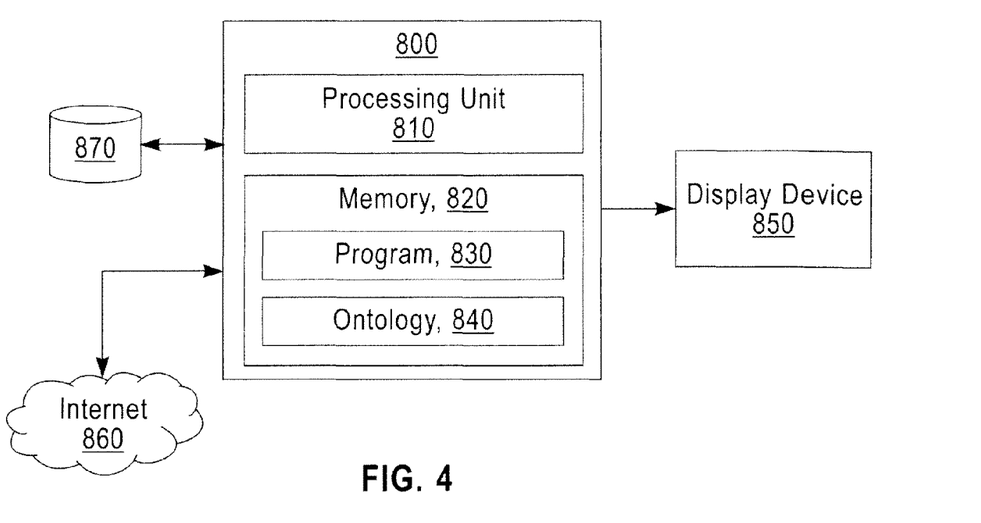
FIG. 4 shows a simplified block diagram of an exemplary electronic device that is suitable for use in practicing various exemplary embodiments of this invention.

FIG. 4 shows a simplified block diagram of an exemplary electronic device that is suitable for use in practicing various exemplary embodiments of this invention. The apparatus 800 includes processing unit 810 (e.g., a controller, one or more data processors, etc.) and a computer-readable memory medium embodied as a memory 820. The memory 820 may stores at least one program of computer instructions 830 and/or an ontology 840. The apparatus 800 may be configured to communicate with a memory storage device 870 (e.g., a database, a RAID array, etc.) and a network (e.g., the Internet 860). Additionally, the apparatus 800 may be configured to cause results to be displayed via a suitable display device 850 (e.g., a monitor, a printer, etc.).

The at least one program of computer instructions 830 is assumed to include program instructions that, when executed by the associated processing unit, enable the apparatus to operate in accordance with exemplary embodiments of this invention.

Various exemplary embodiments of this invention may be implemented at least in part by computer software executable by the processing unit 810, or by hardware, or by a combination of software and hardware (and firmware).

The computer readable memory 820 may be of any type suitable to the local technical environment and may be implemented using any suitable data storage technology, such as semiconductor based memory devices, flash memory, magnetic memory devices and systems, optical memory devices and systems, fixed memory and removable memory. The processing unit 810 may be of any type suitable to the local technical environment, and may include one or more of general purpose computers, special purpose computers, microprocessors and processors based on a multicore processor architecture, as non-limiting examples.

Figure 5:
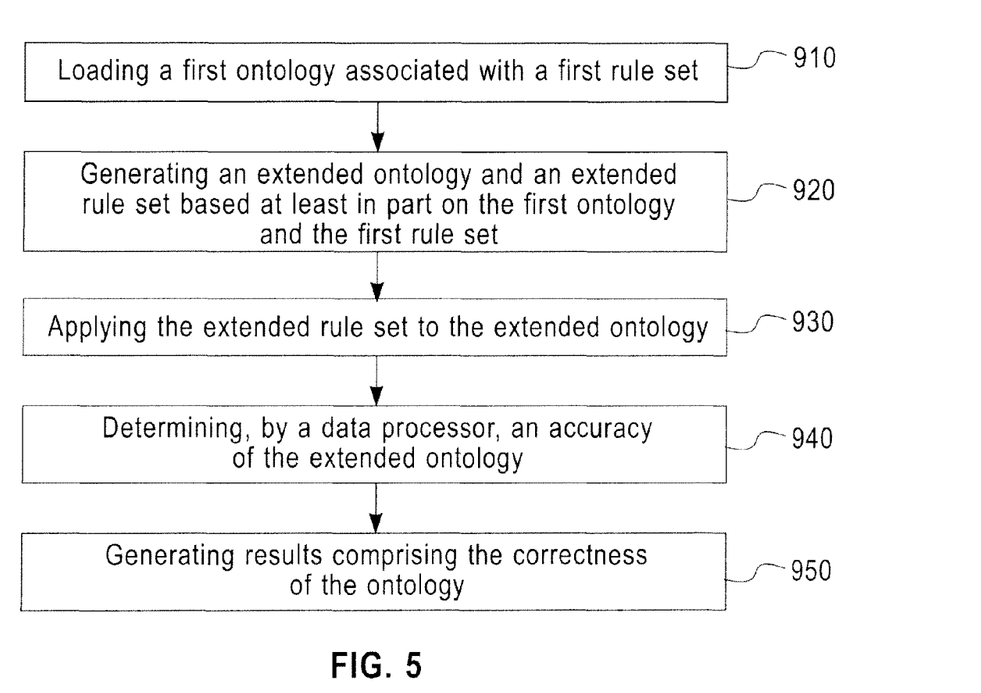
FIG. 5 is a logic flow diagram that illustrates the operation of an exemplary method, and a result of execution of computer program instructions embodied on a computer readable memory, in accordance with the exemplary embodiments of this invention.

FIG. 5 is a logic flow diagram that illustrates the operation of a method, and a result of execution of computer program instructions, in accordance with the exemplary embodiments of this invention. In accordance with these exemplary embodiments a method performs, at Block 910, a step of loading a first ontology associated with a first rule set. Generating an extended ontology and an extended rule set based at least in part on the first ontology and the first rule set is performed, at Block 920. The method performs, at Block 930, a step of applying the extended rule set to the extended ontology. Determining, by a data processor, an correctness of the extended ontology is performed, at Block 940. The method performs, at Block 950, a step of generating results comprising the correctness.

The various blocks shown in FIG. 5 may be viewed as method steps, and/or as operations that result from operation of computer program code, and/or as a plurality of coupled logic circuit elements constructed to carry out the associated function(s).

An exemplary embodiment in accordance with this invention is a method for providing an evaluation/verification of the correctness of an ontology. The method includes loading a first ontology associated with a first rule set. an extended ontology and an extended rule set are generated based at least in part on the first ontology and the first rule set. The extended rule set is applied to the extended ontology. The method also includes determining (e.g., by a data processor) an correctness of the extended ontology. Results are generated which include the correctness.

In a further exemplary embodiment of the method above, the method further includes loading namespace location mapping information.

In an additional exemplary embodiment of any one of the methods above, first ontology is a combined ontology and loading the combined ontology further includes loading at least two ontologies. Loading the at least two ontologies may include ensuring elements of the at least two ontologies are not duplicated.

In a further exemplary embodiment of any one of the methods above, the first rule set is configured in accordance with a sematic web rule language.

In an additional exemplary embodiment of any one of the methods above, the results include an indication of at least one of: that stream contents are not variables; that cardinality constraints are met; and that all property values are in specified ranges.

In a further exemplary embodiment of any one of the methods above, loading the first ontology includes accessing a central server; and downloading the first ontology from the central server.

In an additional exemplary embodiment of any one of the methods above, applying the extended rule set is performed using an ontology web language reasoner.

An additional exemplary embodiment in accordance with this invention is an apparatus for providing an evaluation/verification of the correctness of an ontology. The apparatus includes a microprocessor coupled to a memory, wherein the microprocessor is configured to load a first ontology associated with a first rule set; to generate an extended ontology and an extended rule set based at least in part on the first ontology and the first rule set; to apply the extended rule set to the extended ontology; to determine an correctness of the extended ontology; and to generating results including the correctness.

In a further exemplary embodiment of the apparatus above, the microprocessor is further configured to load namespace location mapping information.

In an additional exemplary embodiment of any one of the apparatus above, the first ontology is a combined ontology and loading the combined ontology further includes loading at least two ontologies. Loading the at least two ontologies may include ensuring elements of the at least two ontologies are not duplicated.

In a further exemplary embodiment of any one of the apparatus above, the first rule set is configured in accordance with a sematic web rule language.

In an additional exemplary embodiment of any one of the apparatus above, the results include an indication of at least one of: that stream contents are not variables; that cardinality constraints are met; and that all property values are in specified ranges.

In a further exemplary embodiment of any one of the apparatus above, loading the first ontology includes: accessing a central server; and downloading the first ontology from the central server.

In a further exemplary embodiment of any one of the methods above, applying the extended rule set is performed using an ontology web language reasoner.

An additional exemplary embodiment in accordance with this invention is a computer readable medium for providing an evaluation/verification of the correctness of an ontology. The computer readable medium tangibly encoded with a computer program executable by a processor to perform actions. The actions include loading a first ontology associated with a first rule set; generating an extended ontology and an extended rule set based at least in part on the first ontology and the first rule set; applying the extended rule set to the extended ontology; determining an correctness of the extended ontology; and generating results including the correctness.

In a further exemplary embodiment of the computer readable medium above, the actions further include loading namespace location mapping information.

In an additional exemplary embodiment of any one of the computer readable media above, the first ontology is a combined ontology and loading the combined ontology further includes loading at least two ontologies. Loading the at least two ontologies may include ensuring elements of the at least two ontologies are not duplicated.

In a further exemplary embodiment of any one of the computer readable media above, the first rule set is configured in accordance with a sematic web rule language.

In an additional exemplary embodiment of any one of the computer readable media above, loading the first ontology includes: accessing a central server; and downloading the first ontology from the central server.

In an additional exemplary embodiment of any one of the computer readable media above, applying the extended rule set is performed using an ontology web language reasoner.

A further exemplary embodiment in accordance with this invention is an apparatus for providing an evaluation/verification of the correctness of an ontology. The apparatus includes means for loading a first ontology associated with a first rule set; means for generating an extended ontology and an extended rule set based at least in part on the first ontology and the first rule set; means for applying the extended rule set to the extended ontology; means for determining an correctness of the extended ontology; and means for generating results including the correctness.

In an additional exemplary embodiment of the apparatus above, the apparatus also includes means for loading namespace location mapping information.

In a further exemplary embodiment of any one of the apparatus above, the first ontology is a combined ontology and loading the combined ontology further includes loading at least two ontologies. Loading the at least two ontologies may include ensuring elements of the at least two ontologies are not duplicated.

In an additional exemplary embodiment of any one of the apparatus above, the first rule set is configured in accordance with a sematic web rule language.

In a further exemplary embodiment of any one of the apparatus above, the results include an indication of at least one of: that stream contents are not variables; that cardinality constraints are met; and that all property values are in specified ranges.

In an additional exemplary embodiment of any one of the apparatus above, the loading means includes: means for accessing a central server; and means for downloading the first ontology from the central server.

In an additional exemplary embodiment of any one of the apparatus above, the applying comprises an ontology web language reasoner In general, the various exemplary embodiments may be implemented in hardware or special purpose circuits, software, logic or any combination thereof. For example, some aspects may be implemented in hardware, while other aspects may be implemented in firmware or software which may be executed by a processor unit, one or more microprocessors or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as nonlimiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   loading a first ontology associated with a first rule set, where an ontology is a formal representation of a set of concepts within a domain, and a set of relationships between the concepts;
   generating an extended ontology and an extended rule set based at least in part on the first ontology and the first rule set;
   applying the extended rule set to the extended ontology;
   determining, by a data processor, a correctness of the extended ontology,
   where the correctness is a weighted measurement of errors of the ontology and
   where the correctness is weighted based at least in part on a type of the errors; and
   generating results comprising the correctness of the extended ontology.

2. The method of claim 1, where applying the extended rule set is performed using an ontology web language reasoner.

3. The method of claim 1, further comprising loading namespace location mapping information.

4. The method of claim 1, where the first ontology is a combined ontology and loading the combined ontology further comprises loading at least two ontologies.

5. The method of claim 4, where loading the at least two ontologies comprises ensuring elements of the at least two ontologies are not duplicated.

6. The method of claim 1, where the first rule set is configured in accordance with a sematic web rule language.

7. The method of claim 1, where the results comprise an indication of whether stream contents are not variables; whether cardinality constraints are met; and whether all property values are in specified ranges.

8. The method of claim 1, where loading the first ontology comprises:
   accessing a central server; and
   downloading the first ontology from the central server.

9. An apparatus comprising:
   a microprocessor coupled to a memory, wherein the microprocessor is configured to:
   load a first ontology associated with a first rule set, where an ontology is a formal representation of a set of concepts within a domain, and a set of relationships between the concepts;
   generate an extended ontology and an extended rule set based at least in part on the first ontology and the first rule set;
   apply the extended rule set to the extended ontology;
   determine a correctness of the extended ontology,
   where the correctness is a weighted measurement of errors of the ontology and
   where the correctness is weighted based at least in part on a type of the errors; and
   generating results comprising the correctness of the extended ontology.

10. The apparatus of claim 9, wherein the microprocessor is further configured to load namespace location mapping information.

11. The apparatus of claim 9, where the first ontology is a combined ontology and loading the combined ontology further comprises loading at least two ontologies.

12. The apparatus of claim 11, where loading the at least two ontologies comprises ensuring elements of the at least two ontologies are not duplicated.

13. The apparatus of claim 9, where the first rule set is configured in accordance with a sematic web rule language.

14. The apparatus of claim 9, where the results comprise an indication of whether stream contents are not variables; whether cardinality constraints are met; and whether all property values are in specified ranges.

15. The apparatus of claim 9, where loading the first ontology comprises:
   accessing a central server; and
   downloading the first ontology from the central server.

16. A computer readable memory excluding signals tangibly encoded with
   a computer program executable by a processor to perform actions comprising:
   loading a first ontology associated with a first rule set, where an ontology is a formal representation of a set of concepts within a domain, and a set of relationships between the concepts;
   generating an extended ontology and an extended rule set based at least in part on the first ontology and the first rule set;
   applying the extended rule set to the extended ontology;
   determining a correctness of the extended ontology,
   where the correctness is a weighted measurement of errors of the ontology and
   where the correctness is weighted based at least in part on a type of the errors; and generating results comprising the correctness of the extended ontology.

17. The computer readable memory of claim 16, where the actions further comprise loading namespace location mapping information.

18. The computer readable memory of claim 16, where the first ontology is a combined ontology and loading the combined ontology further comprises loading at least two ontologies.

19. The computer readable memory of claim 18, where loading the at least two ontologies comprises ensuring elements of the at least two ontologies are not duplicated.

20. The computer readable memory of claim 16, where the first rule set is configured in accordance with a sematic web rule language.

* * * * *